Patented June 24, 1930

1,766,338

UNITED STATES PATENT OFFICE

JOHN JOHNSTON, JR., OF ESCONDIDO, CALIFORNIA, ASSIGNOR OF ONE-HALF TO JAMES R. TOWNSEND, OF LOS ANGELES, CALIFORNIA

METHOD OF REFINING LIQUID HYDROCARBONS

No Drawing. Application filed March 28, 1923, Serial No. 628,291. Renewed March 29, 1930.

An object of this invention is to provide a simple, quick and economical method of producing refined petroleums such as gasoline, kerosene, lubricating oil, distillate and other cuts of petroleum from crude petroleum, shale oil and the like.

An object is to dispense with the expensive methods heretofore employed and especially the so-called sulfuric acid method of treatment.

A further object is to produce a pure hydrocarbon product from crude petroleum.

An object is to produce from crude petroleum of an asphaltic base, a pure water-white petroleum product, which is not subject to change by the action of sunlight.

I have discovered that by distilling crude liquid hydrocarbon such as crude petroleum, shale oil and the like and the liquid products thereof in the presence of an acidulated finely powdered adsorbent earth, such, for instance as the substance commercially known as filtrol an analysis of which shows an alumina base and sulfuric acid, the products coming off at the various customary temperatures, will be practically pure gasoline, kerosene, distillates, lubricating oil and other oils, without any further treatment except a possible redistilling in the same manner.

The designated treating substance is a fine white earthy powder which shows acid reaction under litmus test.

The principle of the discovery or invention as at present understood by me, is the distilling and retorting of the oil in the presence of the finely powdered acidulated adsorbent earth charged with sulfuric acid, the different products at different temperatures being taken off as vapors and then liquefied as through a condenser; the same being condensed and separated according to the cuts desired.

In practice, I have found it desirable to first thoroughly incorporate such acidulated earth with the oil and then distill the oil with said acidulated adsorbent earth and take off such cuts as may be deemed desirable according to the oil treated. I may then redistill the various cuts separately in the presence of the adsorbent earth to produce the various final products above referred to. The distillation and redistillation is effected in the presence of the acidulated earth and may be repeated as often as desired in the presence of the adsorbent earth.

The amount of highly adsorbent, finely divided, acidulated, porous earth required, may vary and I have found that satisfactory results may be obtained by the use of such acidulated earth in the proportion of from 2 parts to 10 parts of the earth to 100 parts of the shale oil or crude petroleum; the proportion varying according to the character of the oil and the amount of impurities therein.

In practice I thoroughly mix the finely powdered acidulated adsorbent earth with the oil to be treated and subject the mixture to the requisite temperature or temperatures in the appropriate apparatus, as a still or retort such as is common in the art of distilling or retorting oil; and I take off the various cuts in the usual way and at the usual temperatures until all that is left is the predetermined residuum which may be a liquid, a semi-liquid, a gum or a solid.

The respective cuts may be separately redistilled with fresh charges of acidulated earth or its equivalent mixed in the oil contents of the still.

The products obtained by the method above set forth are clearer and purer than the commercial products with which I am familiar, and retain their water-white color in the presence of sunlight.

Alumina, of itself, is recognized as having great affinity for, and as having a high adsorbtion quality for the discoloring elements of hydrocarbons, and I have discovered that alumina having a sulfuric acid content has a quickened affinity for and enhanced adsorbtion of such undesirable elements in oil. As much of the discoloring matter of hydrocarbons, or mineral oils, is metallic, I find that its corrosion by the sulfuric acid prepares it for more complete and rapid adsorbtion by the alumina. It is further recognized that sulfuric acid is a heat generator which I have discovered adds greatly to the economy of my method both as to factors of time and fuel.

I claim:

1. The method set forth of refining liquid hydrocarbons, which consists in thoroughly incorporating with the liquid a finely divided acidulated earth in the proportions substantially of from two to ten parts in volume thereof, to one hundred parts of the oil, converting the mass in successive stages by varying degrees of heat from 212° to 750° F., collecting the resultant vapor and by condensation, securing the commercial products set forth.

2. The method of producing purified petroleum products from crude petroleum oil, which consists in mixing 100 parts of the crude oil with 10 parts of acidulated earth and distilling off and recovering in successive stages of conversion at increasing temperatures up to coking temperature the hydrocarbons in accordance with the varying degrees of distillation heat applied.

In testimony whereof, I have hereunto set my hand at Los Angeles, California, this 20th day of March, 1923.

JOHN JOHNSTON, Jr.